United States Patent [19]
> Moribe

[11] 3,809,196
[45] May 7, 1974

[54] ONE WAY POSITIVE CLUTCH WITH ONE WAY FRICTION BRAKE
[75] Inventor: Kamataro Moribe, Nagoya, Japan
[73] Assignee: D. Nagata Co. Ltd., Kobe, Japan
[22] Filed: May 30, 1972
[21] Appl. No.: 257,656

[52] U.S. Cl. ............................. 192/12 B, 192/46
[51] Int. Cl. ........................................... F16d 67/02
[58] Field of Search ..................... 192/46, 12 B, 15

[56] References Cited
UNITED STATES PATENTS
709,771  9/1902  Houghtaling ..................... 192/12 B
1,396,343  11/1921  Richardson ........................ 192/46
1,900,957  3/1933  Stanley et al. ....................... 192/46
1,948,082  2/1934  Stangeland ....................... 192/46 X Primary Examiner—Benjamin W. Wyche
Attorney, Agent, or Firm—Wenderoth, Lind & Ponack

[57] ABSTRACT

A one way positive clutch connects a handcrank drive shaft to a driven gear. A ratchet brake prevents the drive shaft from rotating backwards whereby a friction coupling between the drive shaft and gear functions as a drag brake for the gear.

2 Claims, 3 Drawing Figures

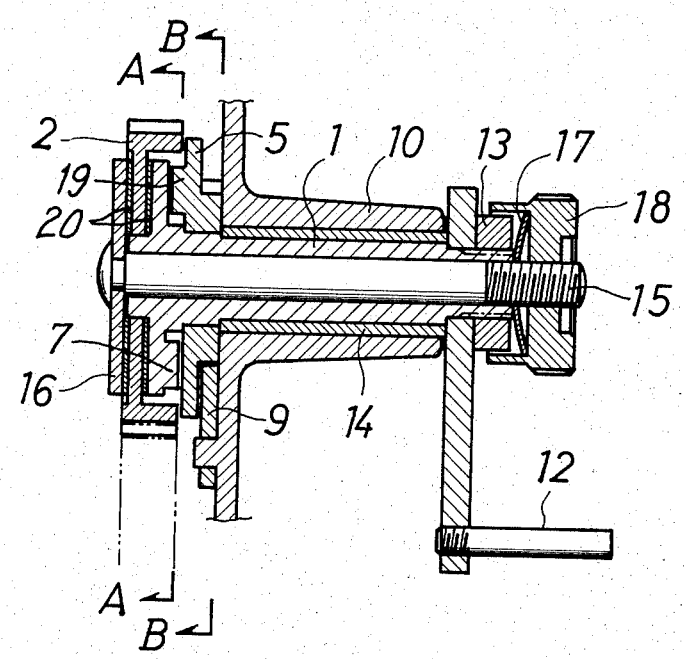
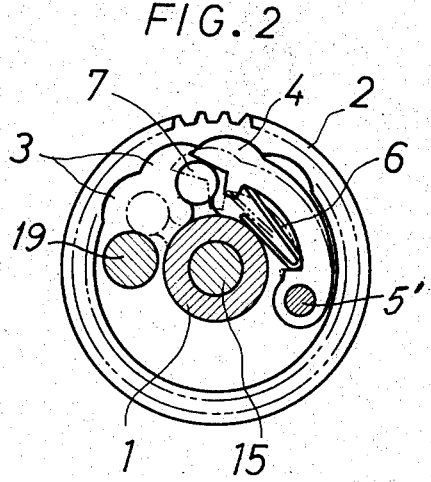
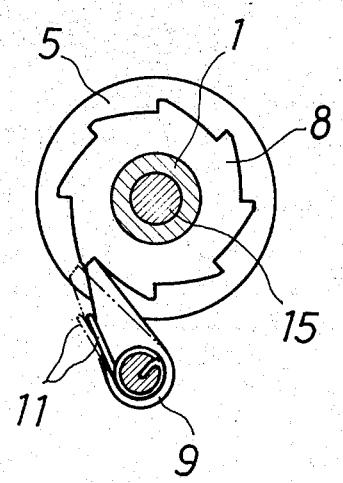

ONE WAY POSITIVE CLUTCH WITH ONE WAY FRICTION BRAKE

This invention relates to a clutch having a drive gear which can be rotated in a direction opposite to the direction of rotation of the main drive shaft.

The object of this invention is to provide an easily made clutch in which the input force applied to the main drive shaft rotates the drive gear, and after the clutch is released, any input to the drive gear merely causes the clutch system to idle without any transfer of force to the main drive shaft.

Other objects and advantages of the present invention will become apparent from a study of the following specification in conjunction with the accompanying drawings, in which:

FIG. 1 is a longitudinal sectional view of the clutch according to the invention;

FIG. 2 is a sectional view taken along line A—A of FIG. 1; and

FIG. 3 is a sectional view taken along line B—B of FIG. 1.

Referring now to the drawings, the clutch according to the present invention comprises a main drive shaft 1, a drive gear 2 having on the periphery thereof teeth for power transmission and also having on the inner circumference inside arcuately shaped grip portions 3 undulating in a wave-shape and positioned in succession around the inner circumference for engaging. An arcuately shaped drive gear claw 4 is pivotally mounted on a drive gear claw plate 5 at 5' as shown in FIG. 2 and which is rotatably mounted on main drive shaft 1. Drive gear claw 4 is always pressed against the inside grip portions 3 of the drive gear 2 by a claw spring 6 positioned between the main drive shaft 1 and the drive gear 2, so that the drive gear claw 4 grips the grip portions 3.

The clutch also comprises a boss 7 mounted on the drive shaft 1 which presses the drive gear claw 4 against an inside grip portion 3 when the main drive shaft is rotated clockwise, as shown by the solid lines in FIG. 2, thereby rotating the drive gear with the drive shaft.

The clutch further comprises a ratchet gear 8, formed on the opposite side of the drive claw plate 5 from that on which the drive gear claw is mounted, and a pawl 9, pivotally mounted on the fixed clutch body 10, is pressed by a pawl spring 11.

A handle 12 is mounted against the end surface of the main drive shaft 1 and secured with a nut 13. The main drive shaft 1 is axially held by a drive shaft sleeve 14 and has extending through the center hollow space a drag shaft 15 covered at the end on which the drive gear is mounted with a drag shaft plate 16 and also secured at the other threaded end by a drag spring 17 and a drag nut 18.

In order to adjust the drag of the clutch, drag nut 18 on drag shaft 15 is tightened or loosened to adjust the pressure of a brake means comprising brake sheets 20 between gear 2 and plate 16, and between gear 2 and a flange formed at the end of shaft 1. This pressure is created by means of spring 17.

When the handle 12 is turned to revolve the main drive shaft 1 clockwise, as shown in FIG. 2, the drive shaft boss 7 presses the drive gear claw 4 into an inside grip portion 3 formed on the inner circumference of the drive gear 2, thereby engaging the drive gear claw 4 with the drive gear 2 and driving the drive gear 2.

In this case, the drive gear claw plate revolves in the same direction together with the main drive shaft 1, the ratchet gear 8 being turned without the ratchet teeth being engaged with the pawl 9, which slips on the ratchet gear 8 although being pressed thereagainst by the pawl spring 11.

Now, if outside force is applied to the drive gear 2 in the direction opposite to the direction of rotation of the main drive shaft 1, or in FIG. 2 counter-clockwise (provided the handle 12 is operated beforehand to a slight extent to release the clutch by placing the drive shaft boss 7 and the drive gear claw 4 in the positions shown in dotted lines in FIG. 2), the pawl 9 acts to prevent the ratchet gear 8 and therefore the drive gear claw plate 5 from turning in the same direction as the drive gear 2, and the drive gear 2 overcomes the force of the claw spring 6 between the main drive shaft 1 and the drive gear claw 4, said drive gear claw 4 being kept in the position shown in dotted lines to allow idling of the drive gear 2.

In addition, engagement of boss 7 with stopper 19, which is connected to plate 5, prevents counterclockwise movement of shaft 1, and, in turn, of handle 12, which is fixed to shaft 1.

Since shaft 1 cannot turn counterclockwise, the friction caused by spring 17 between the members 2, 7, 16, 19 and 20 acts as drag brake to retard rotation of gear 2 in a counterclockwise direction.

As above described, the clutch according to the present invention has the great advantage that such a clutch, capable of transmitting the force of the main drive shaft to the drive gear thereof without hinderance, and also of making the drive gear idle due to any outside force applied to the drive gear with no transmission of said force to the main drive shaft can easily be manufactured and contribute to the wide range of mechanisms of like nature.

While the best form and embodiment of the invention has been illustrated and described, it will be apparent to those skilled in the art that modifications and changes may be made in the device described without deviating from the invention set forth in the following claims.

What is claimed is:

1. A clutch having a drive gear which can rotate relative to the main drive shaft, comprising: a main drive shaft, a drive gear mounted on said drive shaft for rotation around the axis of the drive shaft, said drive gear having inside grip portions on the inner circumference thereof spaced around the inner circumference, each of said grip portions being concave and substantially arcuately shaped, a drive gear claw plate rotatably mounted on the main drive shaft, a drive gear claw pivotally mounted on said drive gear claw plate, said drive gear claw being convex and substantially arcuately shaped, the shape of said claw being substantially complementary to the shape of each of said grip portions, spring means engaging said drive gear claw and urging said claw against the grip portions on the inner circumference of the drive gear, means on said drive shaft for engaging said drive gear claw and for positively holding it into engagement with said grip portions during rotation of said drive shaft in the driving direction, and means engagable with said drive gear claw plate blocking the rotation thereof in the direction opposite to the drive direction, whereby after the clutch is released by disengaging the means on said drive shaft from said drive gear claw, the drive gear can rotate relative to the main shaft in response to a force applied thereto.

2. A clutch as claimed in claim 1 in which said drive gear claw plate has a ratchet gear thereon, and said means engagable with said drive gear claw plate is a pawl engagable with said ratchet gear.

* * * * *